United States Patent [19]

Mallick

[11] Patent Number: 4,823,137

[45] Date of Patent: Apr. 18, 1989

[54] MULTIPLE-FIXED-FREQUENCIES NAVIGATION SYSTEM

[76] Inventor: Brian C. Mallick, 1525 Amherst Manor Dr., #510, Williamsville, N.Y. 14221

[21] Appl. No.: 38,040

[22] Filed: Apr. 13, 1987

[51] Int. Cl.$^4$ .................. G01S 3/02; G01S 13/08; G01S 21/00
[52] U.S. Cl. .................................. 342/457; 342/146; 364/449
[58] Field of Search ............... 342/457, 463, 458, 398, 342/444, 146, 125, 129; 455/56; 364/449

[56] References Cited

U.S. PATENT DOCUMENTS

| | | | |
|---|---|---|---|
| 2,257,320 | 9/1941 | Williams | 250/11 |
| 2,402,410 | 6/1946 | Kear | 250/11 |
| 2,404,501 | 7/1946 | Kear | 250/11 |
| 2,616,076 | 10/1952 | Lyman et al. | 343/5 |
| 3,020,546 | 2/1962 | Jolliffe | 343/106 |
| 3,095,566 | 6/1963 | Dethloff et al. | 343/106 |
| 3,349,399 | 10/1967 | Bohm | 343/106 |
| 3,648,285 | 3/1972 | Sanders | 343/6.5 R |
| 3,721,950 | 3/1973 | Jorgensen et al. | 340/3 E |
| 4,017,860 | 4/1977 | Earp | 343/106 |
| 4,203,114 | 5/1980 | Gerst et al. | 342/444 |
| 4,494,119 | 1/1985 | Wimbush | 342/457 |

OTHER PUBLICATIONS

"Navigation and Positioning Report", Ocean Industry, May 1986, vol. 21, No. 5, pp. 19-49.

*Primary Examiner*—Theodore M. Blum
*Assistant Examiner*—David Cain
*Attorney, Agent, or Firm*—Arnold, White & Durkee

[57] ABSTRACT

A radio navigation system is disclosed which uses multiple fixed frequencies for calculating the bearing and distance of a local station from a central station. The central station has a receiver and an array of fixed, directional antennas all transmitting signals at different frequencies. The local station has a transmitter for transmitting a query signal to the central station, a plurality of local receivers to receive signals from the antenna array, and a stored-program processor. Each of the local receivers operates at a fixed frequency substantially equal to the frequency at which its respective central transmitter and central antenna is operating. A stored-program processor measures the elapsed time between receipt of the query signal from the local station and receipt of a navigational signal from the central transmitters and, using this data, calculates the distance between the local station and the central station. The stored-program processor also compares the relative signal strengths of the signals received by the local station from the various antennas in the antenna array of the central station and, using this data, calculates the bearing of the local station from the central station.

13 Claims, 9 Drawing Sheets

MULTIPLE-FIXED-FREQUENCIES NAVIGATION SYSTEM

BACKGROUND AND SUMMARY OF THE INVENTION

This invention relates to a navigational system for determining the bearing and distance of one object with respect to another, the two objects being above ground in the earth's atmosphere or in outer space. It more particularly relates to a radio navigation system using multiple fixed frequencies.

The known related art systems do not use a fixed antenna array to send out unmodulated radio signals. They either mechanically rotate a directional antenna at the central station or electronically simulate such a rotating antenna. Further, most known systems modulate the radio beacon as it rotates.

U.S. Pat. No. 2,616,076 to Lyman et al. teaches rotating a directional antenna 51 at the reference station, and determining the azimuth (bearing) of the mobile station from the phase of a component of a carrier signal received at the receiver of the mobile station (Column 4, lines 24–56). The Lyman et al. patent also teaches using the round-trip travel time of the radio waves between the mobile station and the reference station to determine the distance between the two stations (Column 5, lines 17–60).

U.S. Pat. No. 3,648,285 to Sanders teaches using an interrogation pulse and the two-way radiation time to determine the distance of the mobile station (an airborne aircraft) from the fixed station (a ground station) (Column 2, lines 42–45). The Sanders patent teaches using a ground station having a rapid elevation frequency scan and a somewhat lower azimuth phase scan of a planar array. Elevation angle data is air-derived from the frequency of the pencil beam energy as it passes across the aircraft. Azimuth position of the ground antenna pencil beam is separately supplied through an independent modulation which is correspondingly decoded in the air.

U.S. Pat. No. 3,721,950 to Jorgensen et al. teaches using a navigation beacon having a pair of responsive devices rotating at different angular velocities. In operation, an observer at a particular bearing relative to the beacon receives two distinct responses from a pair of reflectors or transponders. Bearing is determined from the time interval between the two distinct responses. Range is determined from the interval between interrogation and response.

U.S. Pat. No. 4,017,860 to Earp teaches using a fixed planar matrix of antennas with programmed excitation to produce a moving pencil beam of radiation. This produces an artificial Doppler signal component as observed at a remote receiving station. Navigational information is derived from the signal using the principle that the Doppler shift in frequency is proportional to the cosine of the angle which a radio receiver of the system subtends with respect to the line of movement of the source.

Known existing devices transmit either a rotating and/or modulating radio beacon. Rotating the radio beacon is disadvantageous because the navigational signal is transmitted to only a small volume of space at any one time. Modulating the radio beacon is disadvantageous because the time consumed in modulating and demodulating limits the repeat transmission rate of the navigational signal.

Applicant overcomes the above-noted and other drawbacks of the known related art by providing a method and apparatus for a radio navigation system using multiple fixed frequencies. A system according to the present invention features the capability of providing both bearing and distance information. The present invention eliminates the undesirable feature common to known existing devices wherein the radio beacon transmitted by the central station is rotated and/or modulated. Applicant believes that the preferred embodiment disclosed herein is the first radio navigation system which: (1) uses multiple fixed frequencies; (2) provides both bearing and distance information; and (3) does not require a rotating or modulating radio beacon from the central station. Thus, the present invention allows navigational signals to be transmitted over the entire area of interest simultaneously, with a rapid repeat transmission rate.

A radio navigation system according to the present invention uses multiple fixed frequencies for calculating the bearing and distance of a local station from a central station. According to one aspect of the present invention, the central station has a receiver and an array of fixed, directional antennas all transmitting signals at different frequencies. According to another aspect of the present invention, the local station has a transmitter for transmitting a query signal to the central station, a plurality of local receivers to receive the signals from the array, and a stored-program processor.

In one embodiment of the present invention, each local receiver operates at a fixed frequency identical to the frequency at which its respective central transmitter and central antenna is operating. A stored-program processor measures the elapsed time between transmission of the query signal from the local station and receipt of a navigational signal from the central transmitters. Using this data, the processor calculates the distance between the local station and the central station. The stored-program processor also compares the relative signal strengths of the signals received by the local station from the various antennas in the antenna array of the central station. Using this data, the processor calculates the bearing of the local station from the central station.

The above-noted and other aspects of the present invention will become more apparent from a description of the preferred embodiment when read in conjunction with the drawings.

BRIEF DESCRIPTION OF THE DRAWINGS

The invention will further be described by reference to the accompanying drawings which illustrate a particular embodiment of a multiple-fixed-frequencies radio navigation system in accordance with the present invention, wherein like members bear like reference numerals and wherein.

DESCRIPTION OF THE PREFERRED EMBODIMENT

Figure 1A:
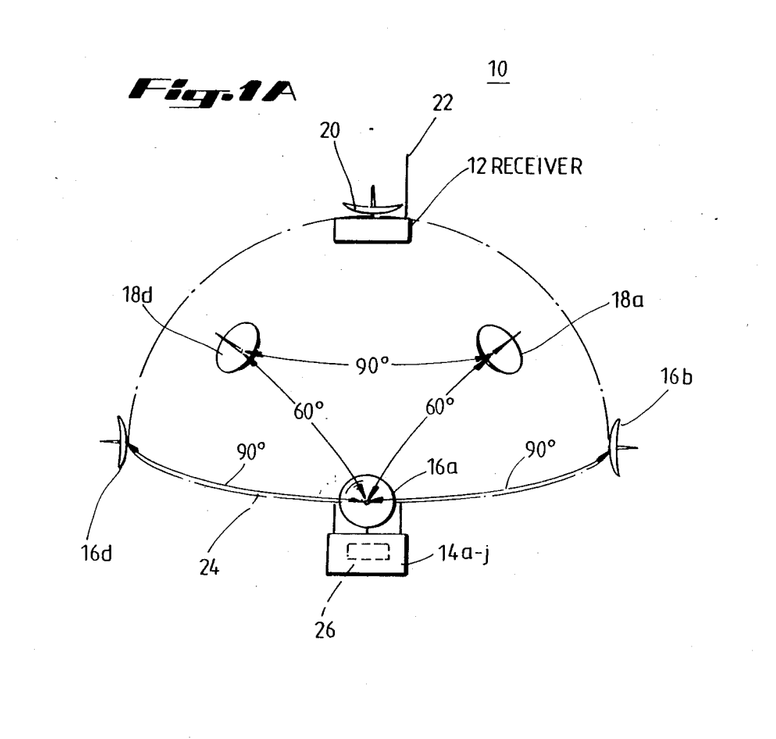
FIG. 1A is a side view of a central station of a navigation system according to the present invention.
Figure 1B:
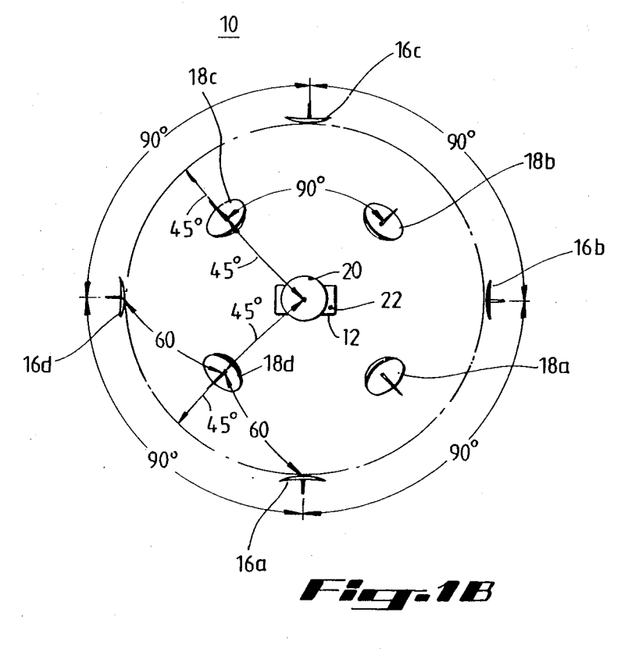
FIG. 1B is a top view of the central station of FIG. 1A.

Referring now to the drawings, and in particular to FIGS. 1A and 1B, a central station 10 includes a central receiver 12, central transmitters 14a–14j, central equatorial antennas 16a–16d, central upper antennas 18a–18d, a central polar antenna 20, and a central omni-directional dipole antenna 22. The central equatorial antennas 16a–16d, are fixed, directional antennas. The central upper antennas 18a–18d and the central polar antenna 20 are also fixed, directional antennas.

The central equatorial antennas 16 are spaced ninety degrees apart along the imaginary bottom line 24 of an imaginary hemisphere. The central upper antennas 18a–18d are spaced ninety degrees apart, and are disposed such that each antenna 18 is located forty-five degrees from the central polar antenna 20 and forty-five degrees from the bottom line 24 of the hemisphere. Each central upper antenna 18 is further located sixty degrees from each of the two closest central equatorial antennas 16. Each central transmitter 14a–14j is connected to the central antennas 16, 18, 20 and 22 by coaxial cable as follows:

| Central Transmitter | Central Antenna |
|---|---|
| 14a | 16a (equatorial) |
| 14b | 16b (equatorial) |
| 14c | 16c (equatorial) |
| 14d | 16d (equatorial) |
| 14e | 18a (upper) |
| 14f | 18b (upper) |
| 14g | 18c (upper) |
| 14h | 18d (upper) |
| 14i | 20 (polar) |
| 14j | 22 (dipole) |

The central transmitters 14 share a stabilizing circuitry 26. The stabilizing circuitry 26 ensures that each of the central transmitters 14 transmits at the same power level to its respective central antenna.

Figure 2:
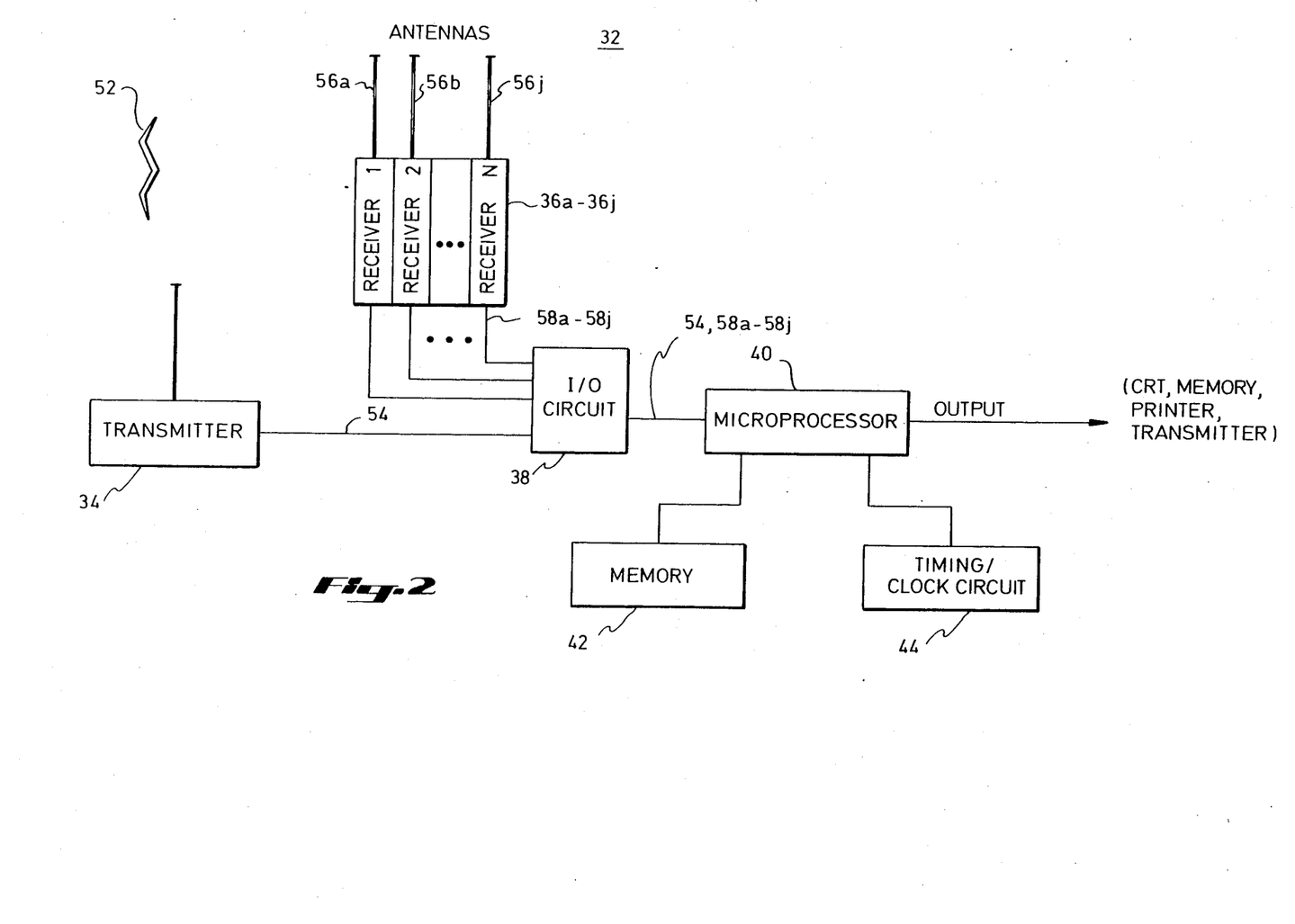
FIG. 2 is a block diagram illustrating a local station of a radio navigation system according to the present invention.

Referring now to FIG. 2, a local station 32 according to the present invention is depicted in block diagram form. A local transmitter 34 and ten local receivers 36a–36j are conductively coupled to a coordinating (input/output) circuit 38. The coordinating circuit 38 is conductively coupled to a stored program processor (microprocessor) 40. The stored program processor 40 is also conductively coupled to a memory 42 and a timing and clock circuit 44.

In operation, the transmitter 34 transmits a query signal 52 to the central station 10. The receiver 12 of the central station 10 receives the query signal 52 through the central omni-directional dipole antenna 22. In response to the query signal 52, the receiver 12 sends ten simultaneous trigger pulses to the transmitters 14a–14j. In response, the transmitters 14a–14j and the antennas 16a–16d, 18a–18d, 20 and 22 each simultaneously broadcast navigational signals 56a–56j, respectively, each navigation signal being broadcast at a different frequency.

At the same time that the query signal 52 is transmitted, a query transmission indication signal 54 is sent from the transmitter 34 through the coordinating circuit 38 to the stored-program processor 40 and the timing circuit 44. In response to the query transmission indication signal 54, the stored program processor 40 and the timing circuit 44 measure the time for the local station 32 to receive a response signal from the omni-directional dipole antenna 22 of the central station 10.

Each receiver 36a–36i in response to its respective navigational signal 56a–56i transmits a signal strength indication signal 58a–58i to the coordinating circuit 38, which in turn transmits the signal strength indication signals 58a–58i to the stored-program processor 40.

The receiver 36j, in response to its navigational signal 56j, transmits a signal reception indication 59j to the stored-program processor 40. As soon as the processor 40 receives the signal reception indication 59j from the receiver 36j corresponding to the central omni-directional dipole antenna 22, the processor 40 calculates the elapsed time between receipt of the transmission indication signal 54 and receipt of the signal reception indication 59j. The stored-program processor 40 has stored in it the speed of radio waves in the earth's atmosphere. Using this data, it calculates the distance between the local and the central stations.

In operation, the stored-program processor 40 compares the signal strength indication signals 58a–58i and computes the angle between the local station and the central station. The antennas 16a–16d, 18a–18d, and 20 each transmit a directional beam whose cross section in any direction through the antenna's longitudinal axis closely approximates the function:

$$f = e^{-y} \qquad \text{Equation 1}$$

where:

$$y = \frac{bx^2}{2} \text{; and} \qquad \text{Equation 2}$$

where:
x is the angle in radians away from the centerline of the angle at which the antenna is facing, and
b is a constant that controls the beam width.

In the present embodiment, b is equal to 3.5782, giving a beam width of sixty-five degrees. Thus, sixty-five degrees away from the centerline of the angle at which the antenna is facing, the power of the transmitted beam is one-tenth of the power along the centerline of the angle at which the antenna is facing. If, for example, a beam width of sixty degrees is desired for a different embodiment, then b must be chosen to be 4.199. The bearing of the local station from the central station is determined using the signal strength indication signals 58a–58i and the known location of the antennas 16a–16d, 18a–18d, and 20. The stored-program processor 40 then calculates the position in Cartesian coordinates through the use of known trigonometric relationships.

Figure 3A:
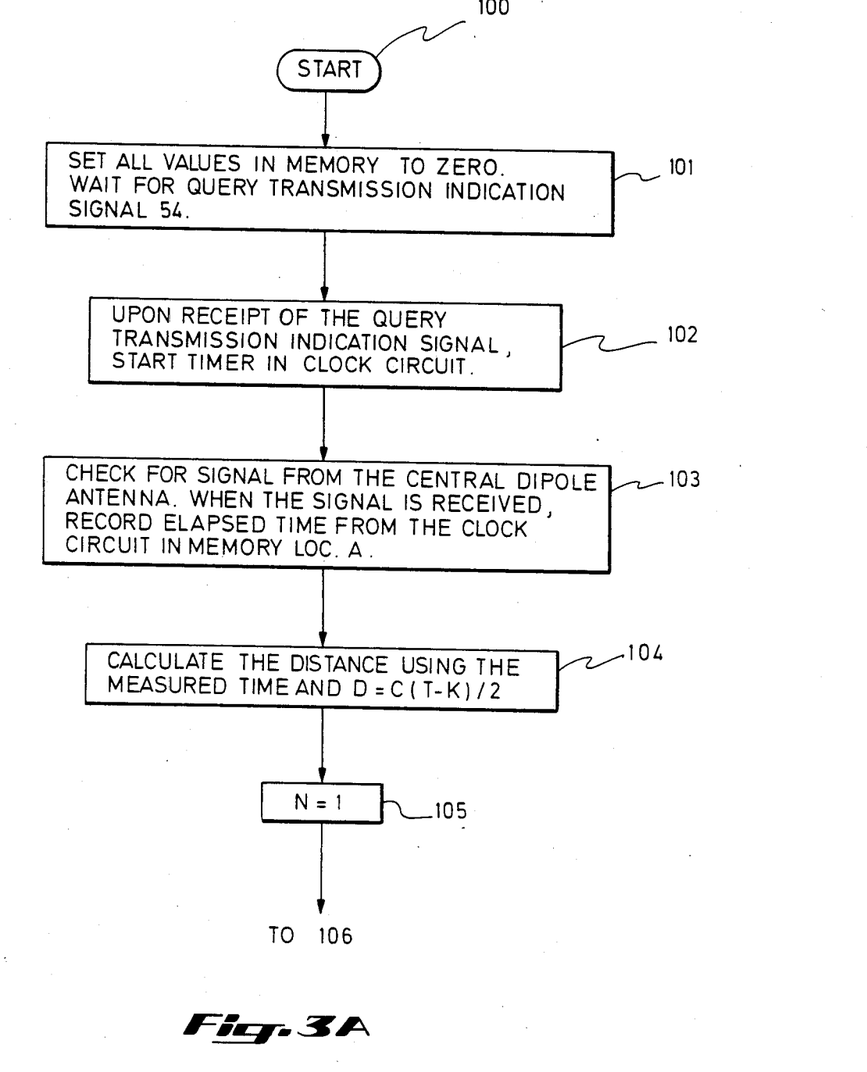
FIGS. 3A–3F depict in flowchart form the method used by the stored program processor 40 to calculate the distance and bearing of the local station from the central station.

Depicted in FIGS. 3A–3F in flowchart form is the method used by the stored program processor 40 to calculate the distance and bearing of the local station from the central station. Referring now to FIG. 3A, and steps 100–105, the stored program processor 40 first sets all values in memory to zero, and then uses the following formula to calculate the distance from the local station to the central station:

$$D_1 = (\tfrac{1}{2})(T_1-K)C \qquad \text{Equation 3}$$

where:
C=the radio wave speed, and
K=the central station circuit delay time.

In Equation 3, $T_1$ is the elapsed time measured by a timer in the clock circuit 44 between receipt of the query transmission indication signal 54 by the stored program processor 40 and receipt of the navigational signal 56j from the central transmitter 14j and its dipole antenna 22.

Figure 3B:
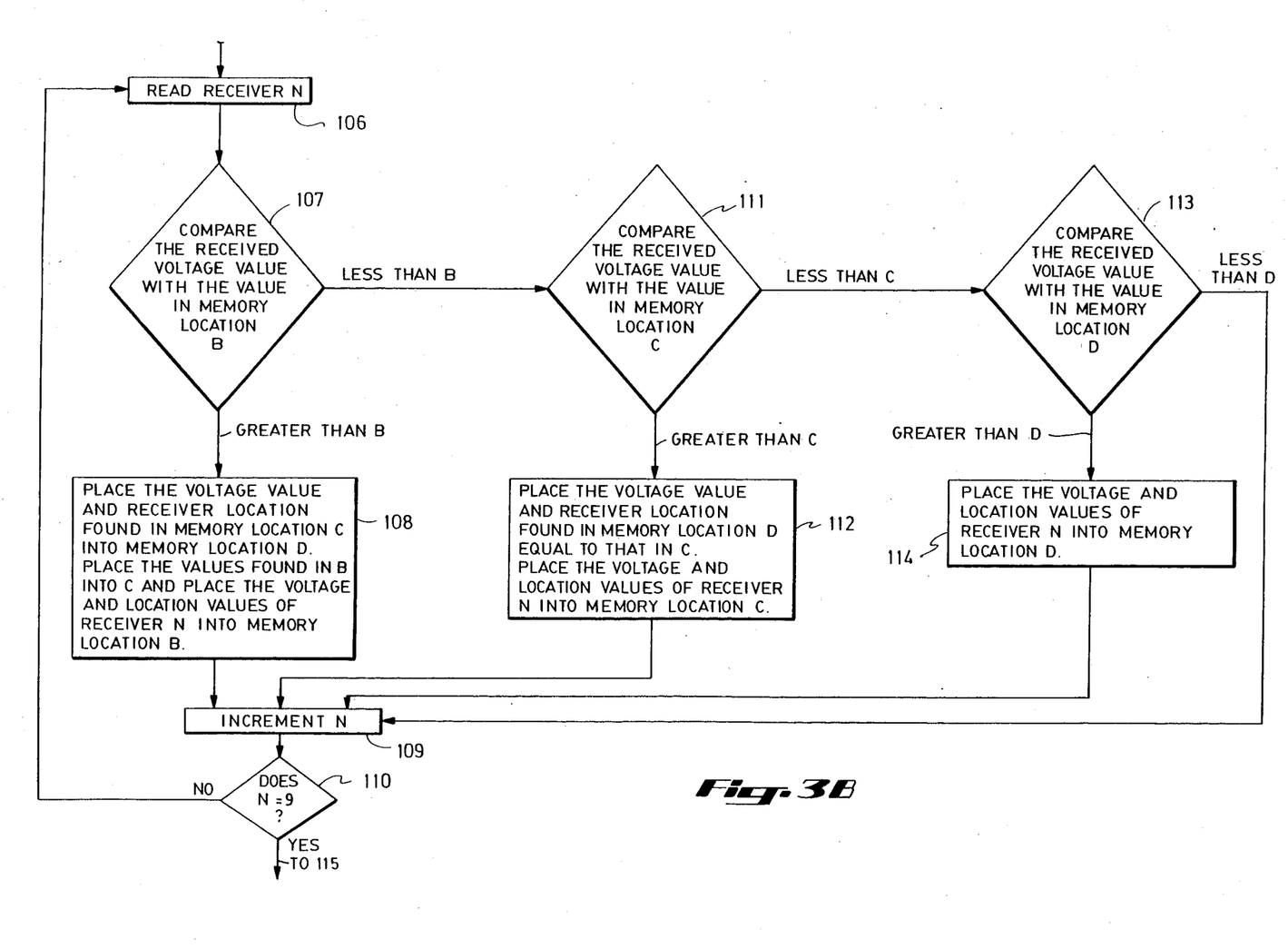

Referring now to FIG. 3B, the stored program processor 40 "reads" 9 of the 10 receivers, 36a–36i (steps 106, 109, and 110), as more fully described below. For each receiver 36N, N=a, b, . . . , i, and starting with N=a, the processor compares the received voltage value 58N (the signal strength indication signal 58a) with a value B in a memory location B. If the received voltage value 58N is less than the value B, then the processor compares the received voltage value 58N with a value C stored in a memory location C. If the received voltage value 58N is also less than the value C, then the processor compares the received voltage value 58N with a value D stored in a memory location D. If the received voltage value 58N is also less than the value D, the processor loops through the same steps using the next receiver 36(N+1) (steps 107, 111, 113, and 109). If the signal strength indication signal 58N is greater than the value B, then the receiver's associated antenna's location, along with the signal strength indication signal 58N, is stored in the memory location B. The antenna location and associated signal strength indication signal previously stored in the memory location B are shifted to the memory location C. Similarly, the values that had been stored in the memory location C are shifted to the memory location D. (As will be apparent to those skilled in the art, the memory locations B, C and D must be appropriately initialized at the beginning of the process.)

Similarly, for step 112, if the signal strength indication signal 58N is less than the value B but greater than the value C, then the receiver's associated antenna's location and the signal strength indication signal 58N are stored in the memory location C. The signal strength indication signal 58N and the location of the antenna previously stored in the memory location C, are shifted into the memory location D as indicated above.

Finally, for step 114, if the signal strength indication signal 58N is greater than the value D stored in the memory location D, then the receiver's associated antenna location and the signal strength indication signal are stored in the memory location D. Thus, after the nine receivers are "read", the three strongest signals and the location of their respective antennas are stored in memory locations B, C, and D, in descending order of signal strength.

Figure 3C:
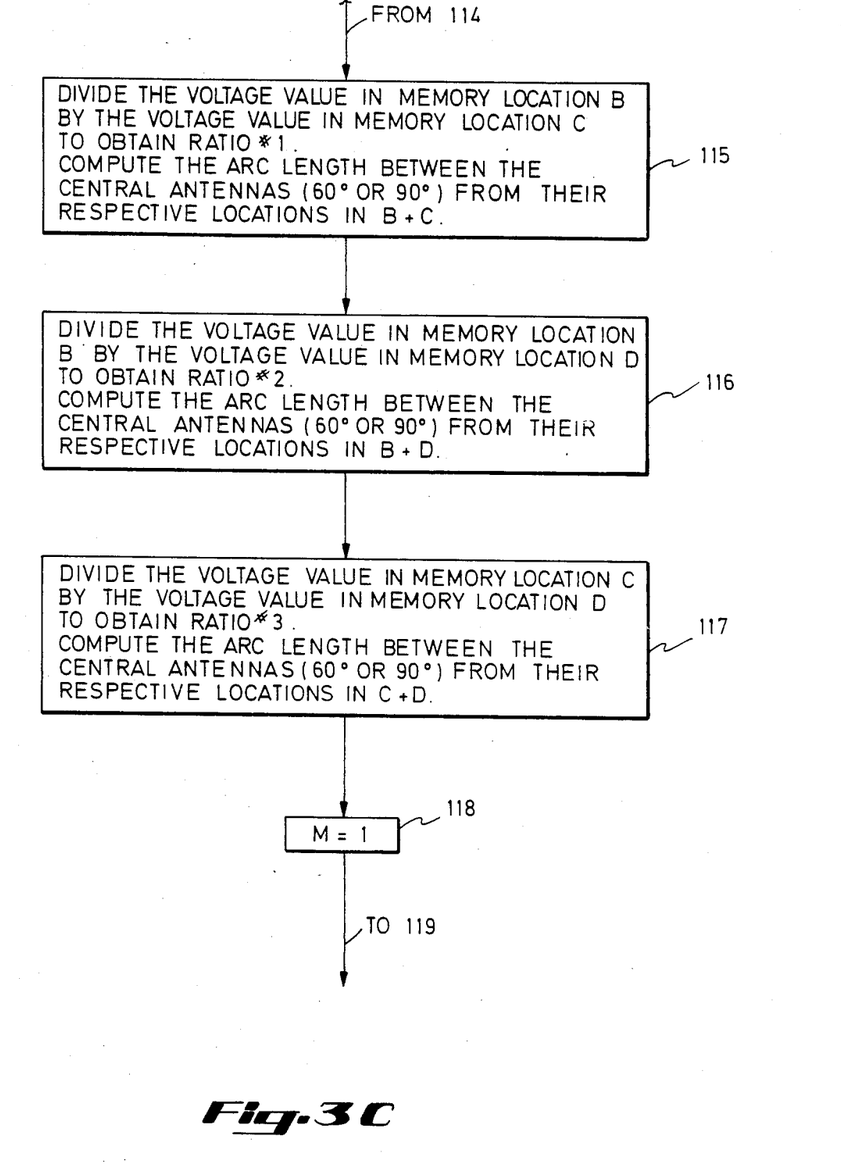

Referring now to FIG. 3C and steps 115–117, the processor 40 calculates three different ratios of the signal strength indication signals 58N stored in memory locations B, C, and D, where $$\text{ratio 1} = \text{value B/value C} \qquad \text{Equation 4}$$

$$\text{ratio 2} = \text{value B/value D} \qquad \text{Equation 5}$$

$$\text{ratio 3} = \text{value C/value D} \qquad \text{Equation 6}$$

The arc lengths, in degrees, between the various antennas of the central station are stored in the memory 42 of the stored program processor 40. The processor 40 uses these values to calculate the arc lengths between the antenna locations stored in memory locations B, C and D (steps 115–117).

Figure 3D:
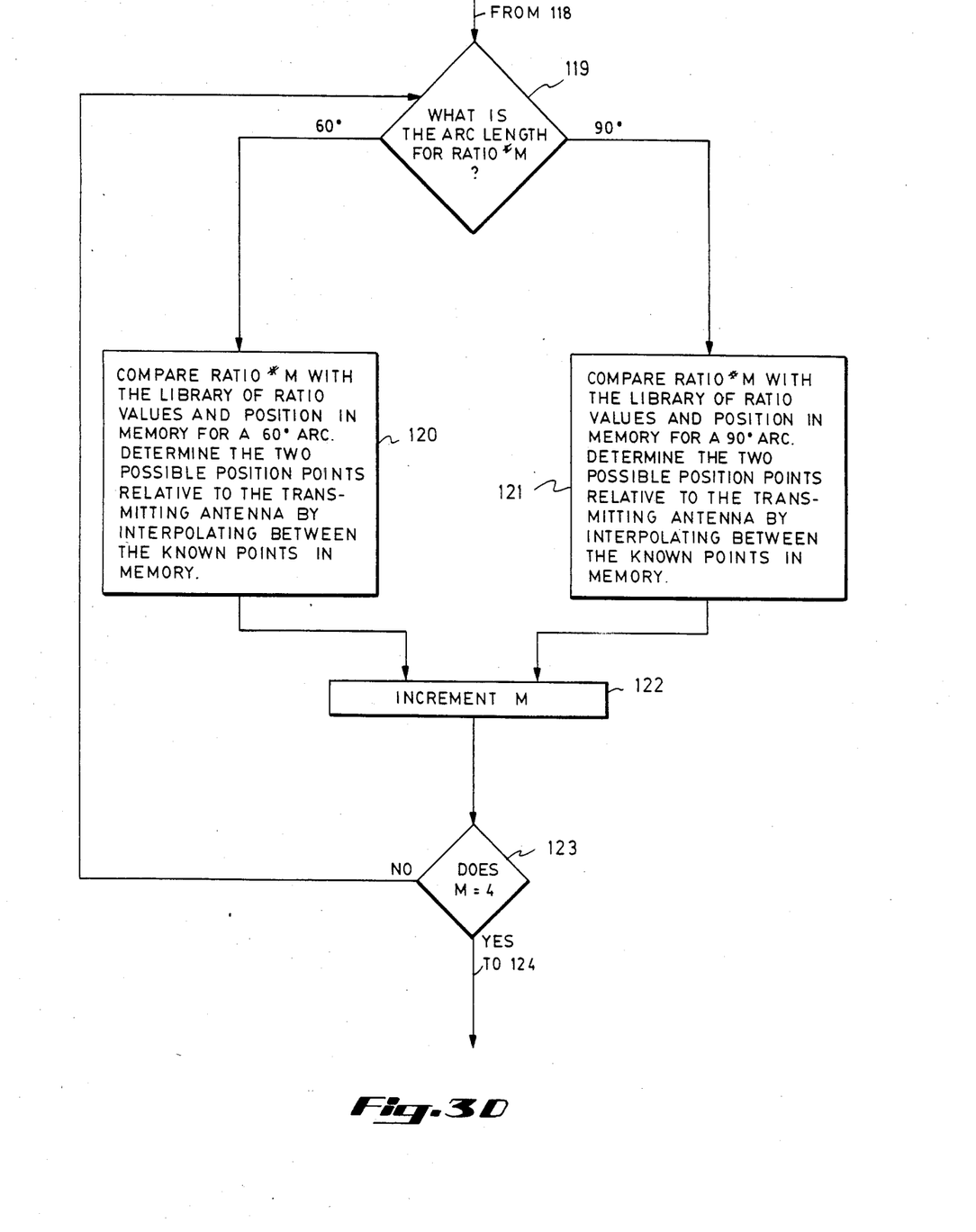

Referring now to FIG. 3D, steps 119–123, each one of the three ratios is compared to one of two different libraries of ratio values stored in the memory 42, depending on whether the computed arc length from steps 115–117 is 60° or 90°. The processor 40 then determines, for each ratio, the two possible positions of imaginary antennas located on the surface of the imaginary hemisphere comprising the central station, by interpolating between known points stored in the memory 42 (steps 120 and 121).

Figure 3E:
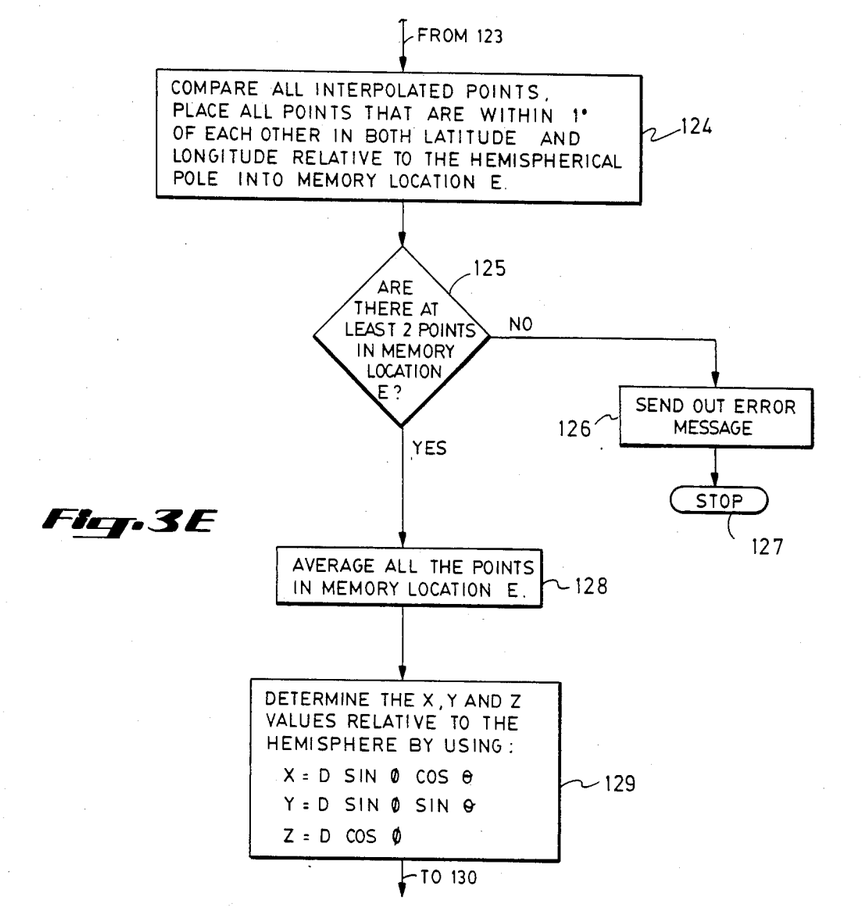

Referring now to FIG. 3E, the processor 40 compares all the interpolated positions resulting from steps 120 and 121 and places into a memory location E (step 124) all positions that are within one degree of each other in both latitude and longitude relative to the hemispherical pole of the imaginary hemisphere comprising the central station. If after step 124 there are not at least two positions stored in the memory location E, then the processor sends out an error message and stops (steps 125–127). On the other hand, if there are at least two positions stored in the memory location E, then the processor averages all the positions in memory location E and determines the X, Y, and Z coordinates of the local station 32 relative to the imaginary hemisphere comprising the central station 10 using the following equations:

$$X = D \sin\phi \cos\theta \qquad \text{Equation 7}$$

$$Y = D \sin\phi \cos\theta \qquad \text{Equation 8}$$

$$Z = D \cos\phi \qquad \text{Equation 9}$$

Figure 3F:
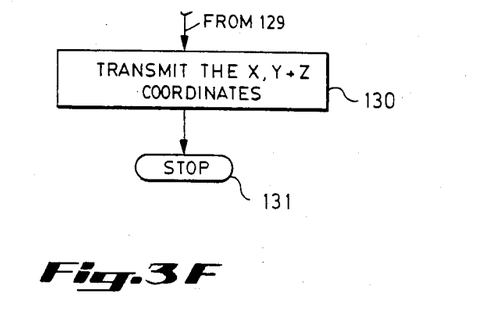
Figure 3G:
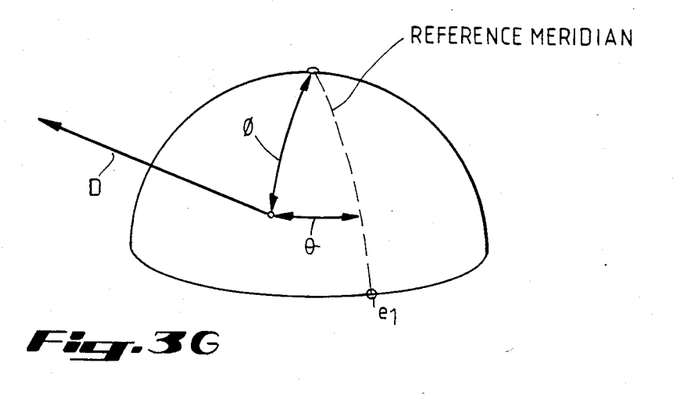
FIG. 3G depicts the angles used in the calculations illustrated in FIG. 3E.

As illustrated in FIG. 3G, $\phi$ is the arc, measured in degrees, from the top center of the imaginary hemisphere comprising the central station to the position on that hemisphere found as a result of steps 123 and 128. The variable $\theta$ is the arc, measured in degrees, in a direction parallel to the bottom line 24 of the hemisphere, from the imaginary position found as a result of steps 123 and 128, to the reference meridian which runs from the top center of the hemisphere to the equatorial transmitter 16A. Referring now to FIG. 3F, after calculating the X, Y, and Z coordinates, the processor 40 outputs those coordinates and stops (steps 130 and 131).

Figure 4:
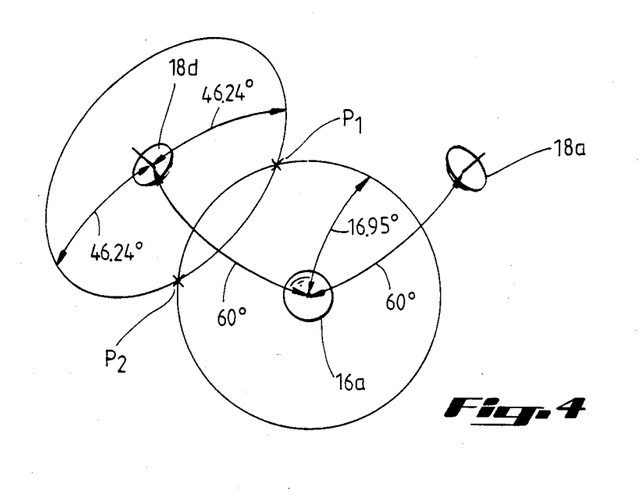
FIG. 4 illustrates for one specific location of the local station, the two possible positions of an imaginary composite antenna used in calculating the bearing of the local station from the central station.

Referring now to FIG. 4, there are illustrated, for one specific location of the local station, the two possible positions of an imaginary composite antenna used in calculating the bearing of the local station from the central station. The procedure for the calculation of those two positions, and the subsequent calculation of the bearing of the local station from the central station, follows. A receiver 36a might receive a navigational signal 56a from a central equatorial antenna 16a, and in response would send out a signal strength indication signal 58a of 0.8551 watts. A receiver 36h might receive a navigational signal 56h of 0.3119 watts. A receiver 36e might receive a navigational signal 56e from a central upper antenna 18a and would send out a signal strength indication signal 58e of 0.1540 watts. In this example, all other receivers would record no transmissions.

From Equation 5, ratio 1=0.8551/0.3119=2.74. The stored-program processor 40 would compare this value to its stored library containing empirically derived valves for transmitting antennas 60° apart. As a result of the comparison, the apparent location on the imaginary hemisphere comprising the central station 10 has to be 16.95 degrees away from the central antenna (antenna 16a) corresponding to the strongest received navigational signal and 46.24° away from the central antenna (antenna 18d) corresponding to the second strongest received navigational signal. FIG. 4 illustrates that there are two possible points, P1 and P2, that satisfy the above conditions.

Using the above technique with the ratio calculated from the received signals from the antennas 16a and 18a, the stored-program processor 40 would determine that since the point P1 is common to both ratios used, the point P1 is therefore the correct point. The third ratio would be used to calculate the common point among the previous two ratios. Thus, the local station's distance and bearing can be calculated relative to any point on the surface of the imaginary hemisphere comprising the central station 10. If the central station 10 is aligned such that one antenna is pointing due north, then one's location in terms of compass directions can be ascertained.

In another embodiment of the present invention, the central station 10 includes additional antennas to reduce the measuring error. In yet another embodiment, the measuring error is reduced by having the stored-program processor 40 measure the distance several times and average the results, and measure the bearing of the local station from the central station several times and average the results.

In another embodiment of the present invention, the distance between the local and central stations is calculated by the stored-program processor by measuring only the signal strengths, not the signal times. In that embodiment, the receiver 36j also transmits a signal strength indication signal 58j. For this embodiment, the stored-program processor 40 is programmed to calculate the distance between the local and central stations using the inverse square rule:

$$p_r = p_t g_t g_r \left(\frac{\lambda}{4\pi d}\right)^2 \qquad \text{Equation 10}$$

where:
$P_r$ = the power (in watts) received at the receivers 36,
$p_t$ = the power (in watts) of the transmitters 14 at the central station,
$g_t$ = the gain of the central dipole antenna 22,
$g_r$ = the gain of the local receiver antenna,
$\lambda$ = wavelength (in meters), and
d = distance (in meters).

In still yet another embodiment of the present invention, antennas 16a and 16c broadcast navigational signals at substantially the same frequency instead of at different frequencies. Thus the signal 58a is substantially the same as the signal 58c. The central equatorial antennas 16b and 16d also broadcast signals that are substantially the same. However, in this embodiment, the frequencies remain different for all the central upper antennas 18a-18d.

In still another embodiment, the frequency is the same for the central upper antennas 18a and 18c, and 18b and 18d, while the central equatorial antennas 16a-16d all use different frequencies. In those embodiments where some antennas share frequencies, the antennas also share the same transmitter 14. Therefore, the local station could have two fewer receivers than the number of transmitting antennas at the central station if the frequencies are shared.

At any point greater than sixty-five degrees away from the direction that any of the antennas 16, 18 or 20 is pointing, the power is less than one-tenth of the power at the center. The receivers 36a-36j of the local station 32 ignore such navigational signals as unreliable, and do not transmit a signal strength indication signal 58 to the stored-program processor 40. Therefore, depending on the value of "b" in Equation 3 above, one of the two signals from two antennas one-hundred-eighty degrees apart might be ignored by the receivers 36a-36j of the local station 32.

In another embodiment of the present invention, there are a number of central omni-directional dipole antennas 22, one antenna 22 for each different user of the system, each antenna 22 operating at a different frequency. Each user has his own local station 32 and shares the central station 10 with the other users. Each central omni directional dipole antenna 22 receives the query signal 52 from each local station and broadcasts a navigational signal 56 which is used by each respective local station 32 to calculate the distance from that respective local station to the central station 10. However, the directional beams from the directional fixed antennas 16a-16d, 18a-18d, and 20 are continuously fired.

In yet another embodiment of the invention, to receive an unlimited number of navigational signals only one query signal 52 is transmitted by a local station. After the central station 10 responds to the query signal 52 by sending out the navigational signals 56a-56j, the central station 10 waits a predetermined time and then automatically sends out another set of navigational signals. This embodiment allows for the rapid receipt and averaging of the distance information by the stored-program processor 40 for a slow-moving local station 32.

The bearing is calculated as described earlier, but the distance calculation is different. In this automatic mode, the predetermined time, R, between navigational signals is 10 milliseconds. The central station circuit delay time, K, is empirically determined, since it varies according to the precise combination of electronic and electrical components comprising the central station. For most conditions, the speed of the radio waves, C, is $3 \times 10^8$ meters/second. For a given number N of navigational signals, and elapsed time $T_N$ between the query signal and receipt by the local station of the navigational signal, the distance is calculated by the stored-program processor 40 using the formula of Equation 3 and the following formula:

$$D_N = \tfrac{1}{2}(T_N - (N-1)R - K)C \text{ for } N > 1 \qquad \text{Equation 11}$$

In still another embodiment of the invention, the central station 10 includes an additional central polar antenna and four additional central upper antennas on the imaginary surface of a second hemisphere, which is situated with the first hemisphere so as to form a sphere. This spherical embodiment may be used anywhere off the surface of the earth.

The principles, preferred embodiments and modes of operation of the present invention have been described in the foregoing specification. The invention is not to be construed as limited to the particular forms disclosed, since these are regarded as illustrative rather than restrictive. Moreover, variations and changes may be made by those skilled in the art without departing from the spirit of the invention.

What is claimed is:

1. A radio navigation system for calculating the bearing and distance of a local station from a central station, the system comprising:
   a. a central station having:
      i. a central receiver for receiving a query signal and for transmitting a plurality of trigger pulses in response to said query signal;
      ii. a plurality of central transmitters for receiving the plurality of trigger pulses from the central receiver and for transmitting navigational signals, each central transmitter transmitting a navigational signal at a different fixed frequency in response to one of said plurality of trigger pulses;
      iii. an array of fixed, directional antennas for broadcasting the navigational signals, each antenna being conductively coupled to one of the central transmitters; and
   b. a local station having:
      i. a local transmitter for transmitting the query signal to the central receiver and for generating a transmission indication signal;
      ii. a local receiver for receiving a navigational signal and for generating a signal reception indication; and
      iii. a plurality of local receivers for receiving the navigational signals and for generating signal strength indication signals, each local receiver operating at a single fixed frequency, receiving the navigational signal transmitted by one of the central transmitters, and generating a signal strength indication signal; and
      iv. a stored-program processor for receiving the transmission indication signal, the signal reception indication, and the signal strength indication signals, and for calculating the bearing and distance of the local station from the central station.

2. The radio navigation system of claim 1 wherein the array of fixed, directional antennas of the central station is a hemispherical array.

3. A radio navigation system for calculating the bearing and distance of a local station from a central station in response to a query signal from the local station, the system comprising:
   a. a central station having:
      i. an omni-directional antenna;
      ii. a central receiver conductively coupled to the omni-directional antenna for receiving the query signal and for transmitting trigger pulses in response to said query signal;
      iii. a first predetermined number of central transmitters for receiving at least one of the trigger pulses from the central receiver and for simultaneously transmitting navigational signals;
      iv. a second predetermined number of central transmitters for receiving at least one of the trigger pulses from the central receiver and for simultaneously transmitting navigational signals, wherein each central transmitter transmits a navigational signal at a different fixed frequency in response to one of said trigger pulses, and wherein one of the central transmitters is conductively coupled to the omni-directional antenna;
      v. an array of fixed, directional antennas for broadcasting the navigational signals, each antenna being conductively coupled to one of the central transmitters; and
   b. a local station having:
      i. a local transmitter for transmitting the query signal to the central receiver and for generating a transmission indication signal;
      ii. a local receiver for receiving a navigational signal from the omni directional antenna of the central station, and for generating a signal reception indication;
      iii. a plurality of local receivers equal in number to the sum of the first and second predetermined number of central transmitters, for receiving the navigational signals and for generating signal strength indication signals, one of the local receivers operating at a single fixed frequency corresponding substantially to the fixed frequency of one of the predetermined number of central transmitters for receiving the navigational signal transmitted by said one of the predetermined number of central transmitters and generating one of the signal strength indication signals; and
      iv. a stored-program processor for receiving the transmission indication signal and the signal strength indication signals, and for calculating the bearing and distance of the local station from the central station.

4. The radio navigation system of claim 3 wherein the omni-directional antenna is a fixed dipole antenna.

5. The radio navigation system of claim 3 wherein the array of fixed, directional antennas of the central station is a hemispherical array.

6. The radio navigation system of claim 3 further comprising a coordinating circuit disposed intermediate the stored-program processor and the local transmitter and the plurality of local receivers, for receiving the transmission indication signal from said local transmitter and for selectively transmitting said transmission indication signal to said stored-program processor, and for receiving the signal strength indication signals from said plurality of local receivers and for selectively transmitting said signal strength indication signals to said stored-program processor.

7. The radio navigation system of claim 4 wherein the array of fixed, directional antennas of the central station is a hemispherical array.

8. The radio navigation system of claim 6 wherein the array of fixed, directional antennas of the central station is a hemispherical array.

9. A radio navigation system for calculating the bearing and distance of a local station from a central station, the system comprising:
   a. a central station having:
      i. a central receiver for receiving a query signal and for transmitting a plurality of trigger pulses in response to said query signal;
      ii. a plurality of central transmitters for receiving the plurality of trigger pulses from the central receiver and for transmitting navigational signals, each central transmitter transmitting a navigational signal at a different fixed frequency in response to one of said plurality of trigger pulses;

iii. an array of fixed, directional antennas for broadcasting the navigational signals, each antenna being conductively coupled to one of the central transmitters; and b. a local station having:

i. a local transmitter for transmitting the query signal to the central receiver and for generating a transmission indication signal;

ii a plurality of local receivers for receiving the navigational signals and for generating signal strength indication signals, each local receiver operating at a single fixed frequency, receiving the navigational signal transmitted by one of the central transmitters, and generating a signal strength indication signal; and iii. a stored-program processor for receiving the transmission indication signal and the signal strength indication signals, and for calculating the bearing and distance of the local station from the central station.

10. A radio navigation system for calculating the bearing and distance of a local station from a central station in response to a query signal from the local station, the system comprising:

a. a central station having:

i. an omni-directional antenna;

ii. a central receiver conductively coupled to the omni-directional antenna for receiving the query signal and for transmitting a plurality of trigger pulses in response to said query signal;

iii. a predetermined number of central transmitters for receiving the plurality of trigger pulses from the central receiver and for simultaneously transmitting navigational signals, each central transmitter transmitting a navigational signal at a different fixed frequency in response to one of said plurality of trigger pulses;

iv. an array of fixed, directional antennas for broadcasting the navigational signals, each antenna being conductively coupled to one of the central transmitters; and b. a local station having:

i. a local transmitter for transmitting the query signal to the central receiver and for generating a transmission indication signal;

ii. a plurality of local receivers equal in number to the predetermined number of central transmitters, for receiving the navigational signals and for generating signal strength indication signals, one of the local receivers operating at a single fixed frequency corresponding substantially to the fixed frequency of one of the predetermined number of central transmitters for receiving the navigational signal transmitted by said one of the predetermined number of central transmitters and generating one of the signal strength indication signals; and iii. a stored-program processor for receiving the transmission indication signal and the signal strength indication signals, and for calculating the bearing and distance of the local station from the central station.

11. A method for calculating the bearing and distance of a local station from a central station in a radio navigation system, wherein said central station includes a central receiver and a plurality of central transmitters and said local station includes a local transmitter, a plurality of local receivers and a stored-program processor, the method comprising the steps of:

1(a) transmitting a query signal from the local transmitter; and

2(b) transmitting a transmission indication signal from the local transmitter;

3(a) receiving the query signal at the central receiver;

2(b) transmitting a plurality of trigger pulses at the central receiver in response to the query signal;

2(c) receiving the plurality of trigger pulses at the plurality of central transmitters; and 2(d) transmitting a navigation signal at a different fixed frequency at each of the central transmitters in response to one of said plurality of trigger pulses; and 3(a) receiving the navigation signals at the plurality of local receivers, each of said local receivers receiving one of said navigation signals;

3(b) generating a signal strength indication signal at each local receiver in response to the navigation signal received by said local receiver; and 3(c) transmitting the signal strength indication signals;

4(a) receiving the transmission indication signal at the stored-program processor;

4(b) receiving the signal strength indication signals at the stored-program processor; and 4(c) calculating the bearing and distance of the local station from the central station at the stored-program processor in response to the transmission indication signal and the signal strength indication signals.

12. The method of claim 11 wherein the query signal and the transmission indication signal are transmitted simultaneously.

13. The method of claim 12 wherein each of the navigation signals are transmitted simultaneously.

* * * * *